Figure 7:
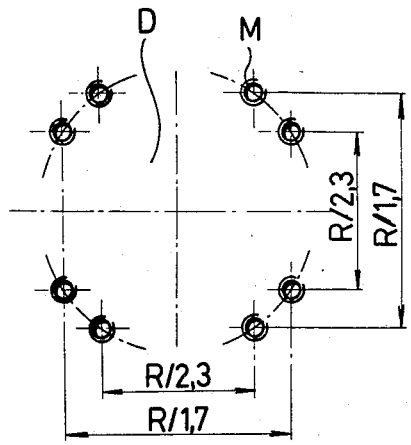

United States Patent [19]

Eisler

[11] 4,331,384
[45] May 25, 1982

[54] OPTOMECHANICAL SYSTEM BUILT-UP OF BASIC ELEMENTS FOR MOVING OPTICAL ELEMENTS WITH A NUMBER OF DEGREES OF FREEDOM

[75] Inventor: Gyula Eisler, Budapest, Hungary

[73] Assignee: Mta Kozponti Fizikai Kutato Intezete, Budapest, Hungary

[21] Appl. No.: 49,651

[22] Filed: Jun. 19, 1979

[30] Foreign Application Priority Data

Jun. 13, 1978 [HU] Hungary .................... MA 2992

[51] Int. Cl.³ .............................. G01B 9/02
[52] U.S. Cl. ...................... 350/321; 356/345
[58] Field of Search ............... 350/321, 114; 248/228; 356/345, 372, 386, 419, 256

[56] References Cited

U.S. PATENT DOCUMENTS

| | | | |
|---|---|---|---|
| 2,841,049 | 7/1958 | Scott | 356/345 |
| 3,352,198 | 11/1967 | Klute | 356/345 |
| 3,528,744 | 9/1970 | Ware | 356/345 |
| 4,209,233 | 6/1980 | Eisler | 350/321 |

FOREIGN PATENT DOCUMENTS

1197989 11/1967 United Kingdom ............... 350/321

OTHER PUBLICATIONS

Positioning-Hardware Tradeoffs, Lussier, Design & Techniques, pp. 79-98 Laser-focus Apr. 1978.
Ardel Kinamatics pp. 24-44, 125-20 18th Ave. College Point, N.Y. 11356.
Physik Instrumente (PI) GmbH, Katalog NR-105 Das Pi-Optische System pp. 11-115.

Primary Examiner—John K. Corbin
Assistant Examiner—Bruce Y. Arnold
Attorney, Agent, or Firm—Young & Thompson

[57] ABSTRACT

A micropositioning system for optical laboratories, enables the precise positioning of optical elements in any orthogonal direction and about any desired axis. The system consists of a relatively small number of basic elements having uniformly arranged systems of bores and members engageable in those bores, including at least one linear moving element, at least one rotating element, and at least five different types of distance pieces, namely, a base plate, a centering support, a support carrying a device for the adjustment of angular position, a right angle, and a through plate.

7 Claims, 36 Drawing Figures

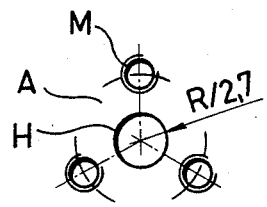
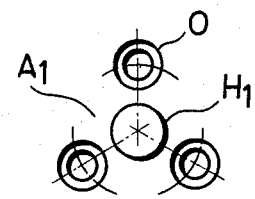
Fig.1    Fig.2
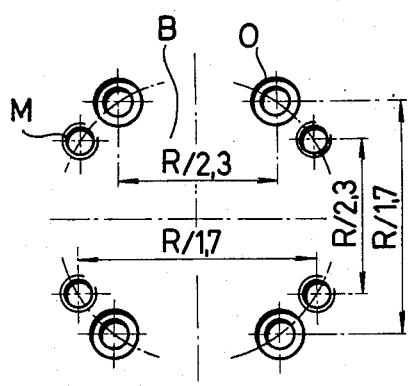
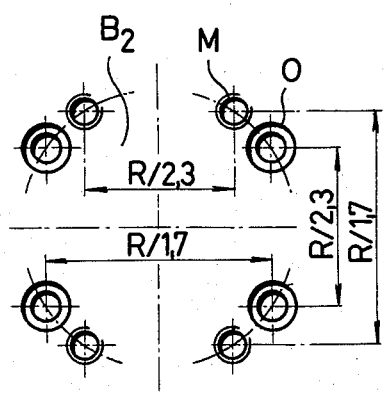
Fig.3    Fig.4
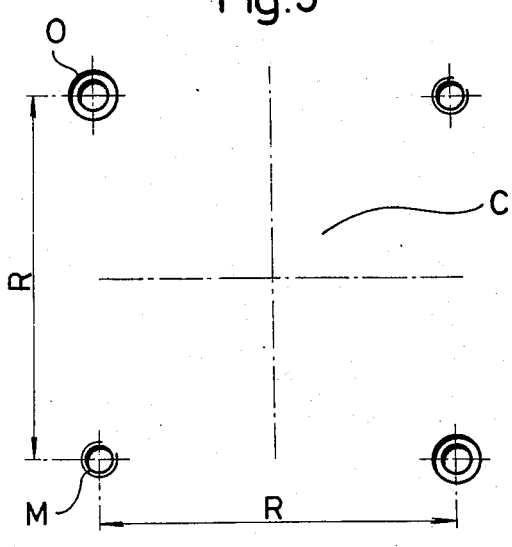
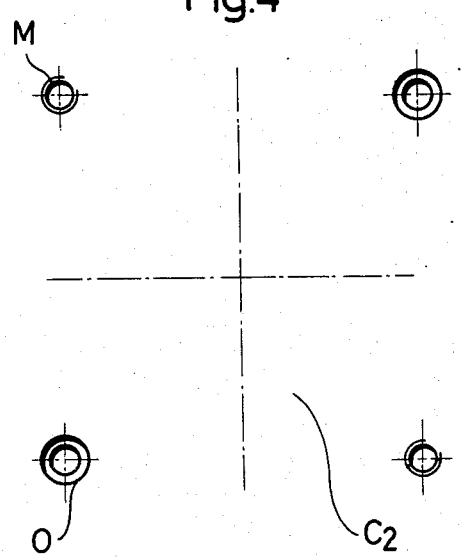
Fig.5    Fig.6

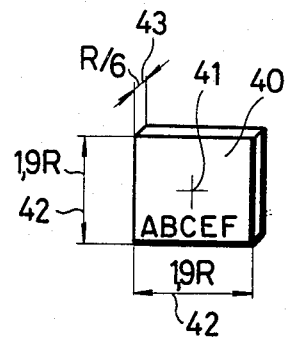
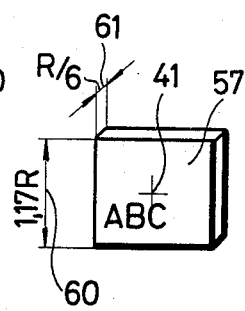
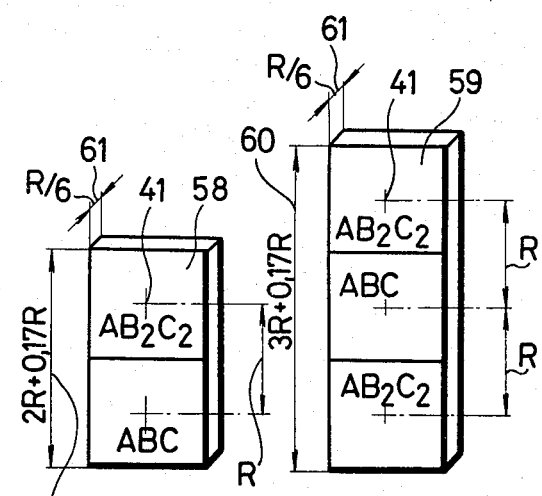
Fig.13  Fig.14  Fig.15  Fig.16
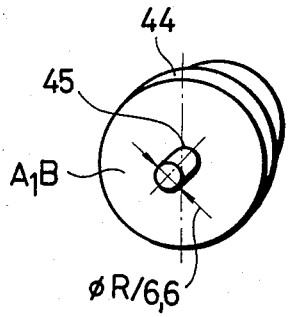
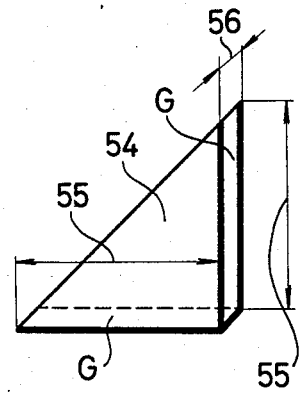
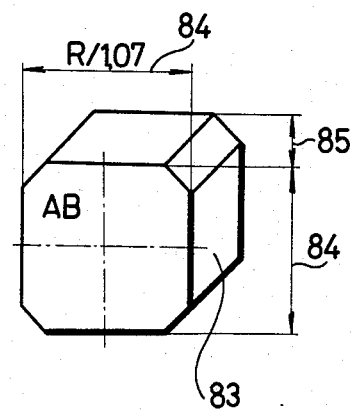
Fig.17  Fig.18  Fig.19
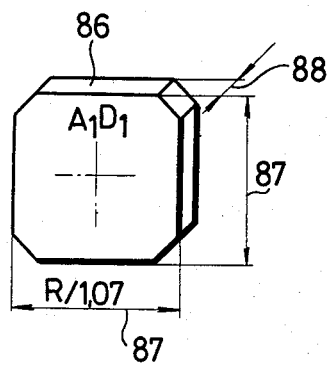
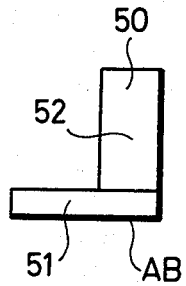
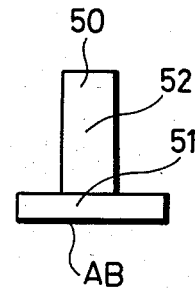
Fig.20  Fig.21  Fig.22

OPTOMECHANICAL SYSTEM BUILT-UP OF BASIC ELEMENTS FOR MOVING OPTICAL ELEMENTS WITH A NUMBER OF DEGREES OF FREEDOM

The invention refers to an optomechanical system built-up of basic elements for moving optical elements with a number of degrees of freedom.

In the course of optical measurements and experiments the optomechanical task arises again and again to bring optical elements of different types and of several sizes, e.g. mirrors, lenses, and polarizes etc. into a correct position i.e. to perform motions of predetermined extent with said elements.

The task can be fulfilled in such a manner that in order to ensure the desired position, the optical element is put onto an optomechanical unit ensuring the degrees of freedom needed for the adjustment, whereas the desired position is adjusted by means of the moving elements of the optomechanical element.

Besides the requirements easy to survey, as e.g. an expedient division of motions, the accuracy of reproduction, mechanical stability, we are confronted with a requirement which can be fulfilled only with essential difficulties, namely the mutual independence of the single degrees of freedom. In a given point of the object the independence of the degrees of freedom can be achieved in such a manner that the section point of the axis of rotation used for adjusting the angular position should cross the given point on the element.

Optomechanical element systems have been well known, by the aid of which the assembly of different adjusting mechanisms becomes possible. Such a system is to be seen in the prospectus of the company ARDEL KINAMATIC U.S.A. N.Y. In the system linear moving elements put into motion directly by means of a micrometer screw led in a ball-guide have been used for linear motions. The moving elements are produced in seven types and even within the single types several variables are to be found. For adjusting the angular position eleven kinds of elements, and within this number, several variables of the unit are used. The high number of the moving elements results from the numerous requirements of measuring arrangements. It has been attempted to bridge over the deviation in sizes and diversity of adjusting configuration of the optical objects by the wide range of sizes of the moving elements. Due to the so-called "stick-slip" owing to the ball-guide, as well as to the movements evoked by the micrometer screw, the system is unsuitable for performing measurements of high absolute and relative accuracies.

The drawbacks of the known system can be summarized, as follows:

(1) For the measuring arrangements several types and sizes of expensive moving elements are needed.

(2) The devices for adjusting the angular position used in the system cover the size of the optical element within restricted limits only.

(3) Due to the guiding and moving solutions applied here, high-grade accuracy of reproduction and absolute accuracies cannot be achieved.

A different solution has been described on page 114 of the catalogue of the Company PHYSIC INSTRUMENTE (PI GmbH, German Federal Republic, Munich). In respect to the composition the system differs from the system ARDEL KINAMATIC already described in so far as the differences in sizes of the optical objectives have been bridged over by means of adjustable rod distance pieces. The guides applied in the moving elements are formed with ball-rows in this case too, as a consequence "stick-slip" also occurs. Due to the "stick-slip", which tends to increase on the long arms due to the Abbe-fault, the length of the rods may be increased within restricted limits only. Similarly, it can be considered as a restricting factor, that in course of clamping the rods, as well as due to the force influences arising in the rods themselves, slippage may occur, as a consequence of which the positions carefully adjusted may be shifted too.

The drawbacks of the system PI compared to those of the system ARDEL may be summarized, as follows:

Although this reduced the variety of the moving elements needed, it simultaneously adversely affected the accuracy achieved, as well as the stability of the system.

The common drawback arising in both systems lies in that recently the requirements regarding to the interferometrical resolution and accuracy occurring in connection with the widely spread application of the lasers and with other microtechnical applications could not be met. E.g. in course of the application of coherent optics we are often confronted with the demand to adjust the single objectives with a resolution of the order of magnitude of the wavelength of the light and with a reproducing accuracy extending 0.1 $\mu$m.

The object of the invention is to provide a universally applicable optomechanical system, in which, by using three kinds of moving elements of interferometrical and normal accuracy, as well as by means of some simple and easily adjustable distance pieces, the majority of the optomechanical tasks arising in optical measuring technique—including the application in the field of coherent optics—can be solved.

The essence of the invention lies in that in dependence on the prescribed measuring and adjusting accuracy, respectively, moving elements belonging to two classes of accuracy are used.

The elements belonging to the class of interferometrical accuracy can be characterized by a resolution and accuracy, the order of magnitude of which is about the wavelength of the light. These elements are free of friction and consequently of stick-slip, their adjustment takes place by means of a lever mechanism with a high transmission ratio, through a micrometer screw and a differential micrometer screw, respectively. Such a device has been described in the Hungarian Patent Application MA-2703 relating to a linear moving element of the class of interferometrical accuracy.

The moving elements of the class of normal accuracy are suitable for the resolution of large measuring ranges of an order of magnitude of 0.01 mm, and ½ angle-minute, respectively. They are guided by means of ball-rows. Their excellent loading and running parameters are obtained by special running surfaces. Such a type is represented by the device serving for the adjustment of the angular position type KS, belonging to the class of normal accuracy, described in the Hungarian Patent Application MA-2835. The set of moving elements of the system consists of linear moving elements and devices for the adjustment of the angular position produced in one single type and size, belonging to the class of interferometrical accuracy, as well as of moving elements and devices for the adjustment of the angular position belonging to the class of normal accuracy.

The optomechanical system thus assembled enables by the aid of seven kinds of distance pieces produced in different sizes and in a very simple way, varying the assembly configuration of the moving elements within wide limits, thus the independence of the degrees of freedom can be ensured independently of the size of the optical objects.

In a preferable embodiment of the solution elements requiring less degrees of freedom, so e.g. mirrors are used, as well as a tiltable socket, turnable around two axles intersecting each other within a small range and provided with inserts suitable for the quick clamping of different mirrors and lenses.

The invention will be described in detail by means of the drawings enclosed showing the embodiments of the optomechanical system, the moving elements, the distance pieces needed for the assembly, as well as the group of bores, where FIGS. 1 to 12 illustrate the groups of bores, FIGS. 13 to 22 the distance pieces, FIGS. 23 to 24 the normal device for adjusting the angular position, FIGS. 25 to 26 the normal linear moving element, FIGS. 27 to 28 the interferometrical linear moving element, FIGS. 29 to 30 the interferometrical device for adjusting the angular position, FIG. 31 the normal tilting socket, FIG. 32 the interferometrical tilting socket, FIG. 33 the arrangement with three linear degrees of freedom, FIG. 34 the device for the adjustment of the angular position with three degrees of freedom of rotation, FIGS. 35 to 36 the variables of the assembly of the optomechanical system.

In FIG. 1 the boregroup A has been illustrated showing the setting bore H and the three threaded bores M arranged around the setting bore H on a circle having the radius R/2.7; the raster size amounting to R=60, being characteristic for all the distance pieces, connecting elements and bore groups.

In FIG. 2 the bore group $A_1$ may be seen arranged in the same manner as the bore group A with the difference, that in the middle instead of the setting bore H there is a setting pin $H_1$ and around the setting pin the through bores O are arranged.

In the bore group B illustrated in FIG. 3, on a circle, arranged at a distance of R/1.7 four threaded bores M are to be seen, whereas on the same circle four through bores O are arranged at a distance of R/2.3 from each other.

The arrangement of the bore group $B_2$ according to FIG. 4 corresponds to that of the bore group B with the difference, that the bore group $B_2$ is obtained from the bore group B rotating the same by 90°, that is to say, the four through bores O will correspond to the four threaded bores M, while the four threaded bores M correspond to the four through bores O.

The bore group C according to FIG. 5 has four bores quadratically arranged on a circle, consisting of two threaded bores M arranged on one diagonal, whereas two through bores O lie on the other diagonal.

The arrangement of the bore group $C_2$ according to FIG. 6 is identical with that of the bore group illustrated in FIG. 5 with the difference, that the bore group $C_2$ has been obtained by rotating the bore group C by 90°, i.e. the two through bores O of the bore group C correspond to the two threaded bores M of the bore group $C_2$, while the two threaded bores M correspond to the two through bores O.

The bore group D illustrated in FIG. 7 incorporates eight threaded bores M arranged on a circle, each pair lying at a distance of R/1.7 and R/2.3 from each other.

Figure 8:
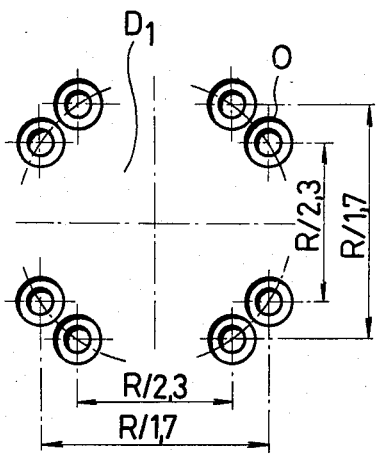

In respect to its arrangement, the bore group $D_1$ according to FIG. 8 corresponds to the bore group D with the difference, that the single through bores correspond to the threaded bores M.

Figure 9:
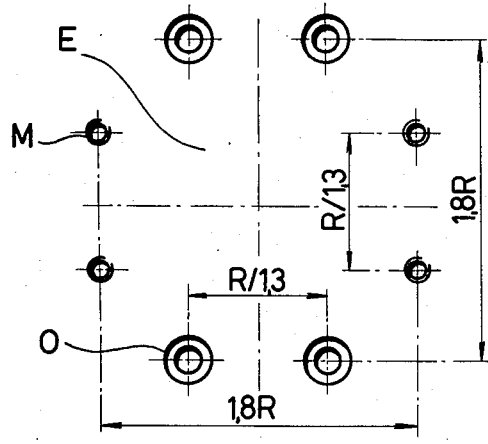

The bore group E according to FIG. 9 incorporates eight bores arranged on a circle, from which two bores each are at a distance of R/1.3 two and bores each at a distance of R/1.8 from each other. The four bores lying nearer to the central line are through bores O, while the others are threaded bores M.

Figure 10:
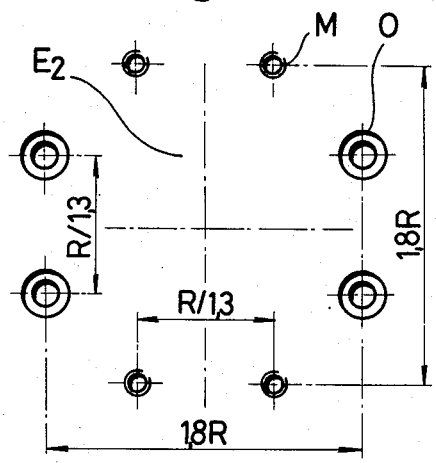

The arrangement of the bore group $E_2$ according to FIG. 10 corresponds to that of the bore group E and can be obtained by rotating by 90°. Accordingly, the four bores lying nearer to the central line are threaded bores M, while those lying farther away are through bores O.

Figure 11:
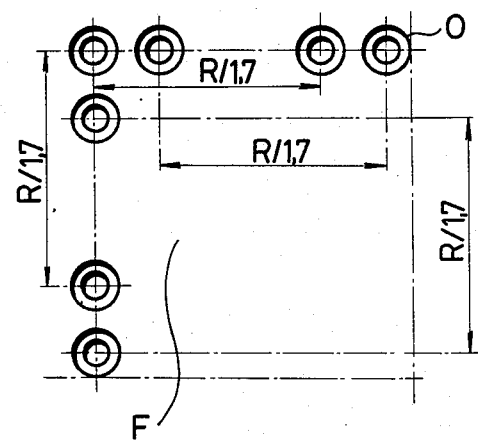

The bore group F according to FIG. 11 has the through bores O arranged on two dividing lines perpendicular to each other, in which the first and the third, as well as the second and the fourth bores are at a distance of R/1.7 from each other.

Figure 12:
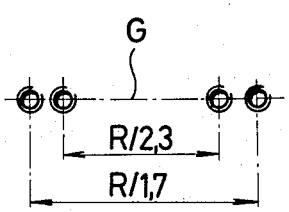

The bore group G according to FIG. 12 has four threaded bores M arranged on one line, in which the two outer bores are at a distance of R/1.7 and the two inner bores at a distance of R/2.3 from each other.

As is to be seen from FIGS. 1 to 12, in respect to assembly possibilities, the following pairs of bores can be connected to each other: $A-A_1$, $B-B_2$, $C-C_2$, $D-D_1$, $E-E_2$, F-G, D-B, G-B, $D-B_2$, $G-B_2$.

In FIG. 13 the base plate 40 has been illustrated, the basic dimension 42 of which amounts to e.g. 1.9 R, while the thickness 43 equals e.g. R/6. The base plate is provided with the bore groups A, B, C, E and F, whereby said bores are centrally symmetrically arranged in relation to the centre 41.

In FIGS. 14, 15 and 16 the first through plate 57, the double-sized second through plate 58, and the triple-sized third through plate 59 are perspectively illustrated. The surfaces of the single elementary squares are provided with the bore groups A, B, C and $B_2$, $C_2$, respectively, arranged centrally symmetrically in relation to the centre 41. The thickness 61 of the through plates 57, 58 and 59 equals R/6, whereas the size of the single elementary squares amounts to R=60 raster-size, while the lateral dimensions 60 of the through plates amount to 1.17 R, 2.17 R and 3.17 R, respectively. The through plates are suitable for forming levers of utmost stiffness and in different lengths.

In FIG. 17 the perspective view of the centralizing underlay 44 is to be seen, having the locating pin 45 of the size R/6 at its centre 41. It is also provided with the bore groups $A_1$ and B. The centralizing underlay 44 serves for the multiaxial assembly of the devices for adjusting the angular position.

In FIG. 18 the perspective view of the right angle 54 applied at the perpendicular assembly of the ground plate 40 has been illustrated, the horizontal and vertical surfaces of which have been provided with the bore group G. The lateral dimensions 55 of the horizontal and vertical sides amount to e.g. 1.16 R, while the thickness 56 equals R/6.

In FIG. 19 the perspective view of the raising block 83 may be seen, the basic dimensions 84 of which are equal to R/1.07. In respect to thickness 85, four sizes are provided of a value of e.g. R/1, R/1.5, R/2.4, and R/6, respectively. The surface of the raising block 83 is provided with the bore groups A and B serving for the assembly with the elements. The raising blocks 83 can be advantageously used for forming very stiff levers. After having rotated by 90°, assembly may take place by means of the bore groups B-B$_2$.

In FIG. 20 the underlying plate 86 is shown, the basic dimensions of which correspond to the basic dimensions 84 of the raising block 83. Thickness 88 amounts to e.g. R/10, R/15, R/24 and R. The surface of the underlying plates is provided with the bore groups A$_1$ and D$_1$. By means of the raising blocks 83 and the underlying plates 86 an optional support with the integral multiple of the dimension R/60 can be assembled.

FIG. 21 is a side view of the asymmetrically assembled support 50 of the device for adjusting the angular position. The support consists of the base plate 51 and the clevis 52. The base is provided with the bore groups A and B, which serve for assembly with the other moving elements and distance pieces, respectively.

Figure 29:
Figure 30:
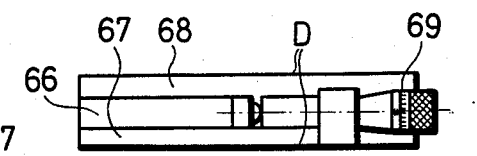

The clevis 52 is provided with bores serving for fixing the normal device for adjusting the angular position (FIGS. 23, 24) and the interferometrical device serving the same purpose (FIGS. 29 and 30).

The support of the device for adjusting the angular position illustrated in FIG. 22 differs from the support shown in FIG. 21 in that the clevis 52 is symmetrically arranged in relation to the base plate 51.

Figure 23:
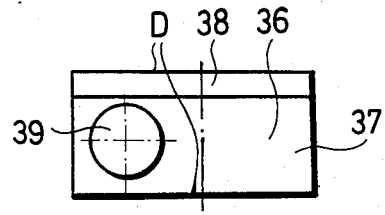

FIG. 23 is a side view of the normal device 36 for adjusting the angular position, consisting of the base plate 37, the circular table 38 and the setting member 39. The base plate 37 and the circular table 38 can be connected to the corresponding distance pieces by means of the bore group D. The inner structure is described in Hungarian Patent Application MA-2835. The technical characteristics are, as follows:

range of rotational displacement—0 to 360°
range of fine-adjustment—10°
resolution of the scale—30"
accuracy of reproduction—3".

Figure 24:
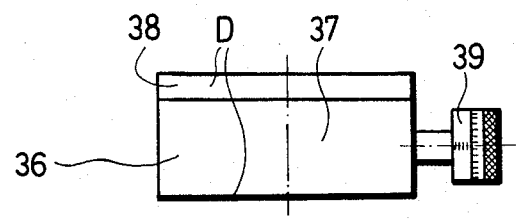

In FIG. 24 the front view of the normal device 36 for the adjustment of the angular position is to be seen, showing also the base plate 37, the circular table 38 and the setting member 39.

Figure 25:
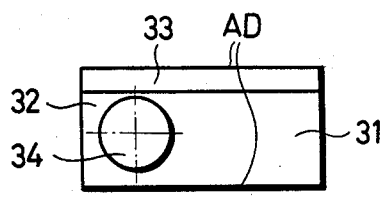

In FIG. 25 the outline of the linear moving element 31 is illustrated in side view, consisting of the base plate 32, the table 33 and the setting member 34. The base plate of the moving element 32 is provided with the bore groups A and D, which enable the assembly with the other moving elements by means of the distance pieces. The inner structural formation is described in Hungarian Patent Application MA-2835. The technical characteristics are the following:

| | |
|---|---|
| range of displacement | 25 and 50 mm. resp. |
| resolution of the scale | 0.01 mm. |
| accuracy of reproduction | 1 μm |

Figure 26:
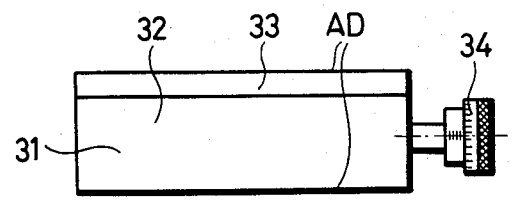

Similarly, in FIG. 26 the outline of the normal linear moving element 31 is to be seen in a frontal view, showing the base plate 32, the table 33 and the setting organ 34.

Figure 27:
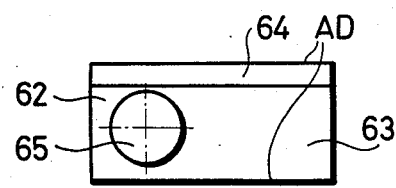

In FIG. 27 the side view of the interferometrical linear moving element 62 is illustrated; the external appearance is identical with that of the normal linear moving element 31 illustrated in FIGS. 25 and 26. The interferometrical linear moving element 62 consists of the base plate 63, the table 64 and the setting member 65. The base plate 63 and the table 64 are provided with the bore groups A and D, which enable the assembly with the other basic moving elements by means of the distance pieces.

Figure 28:
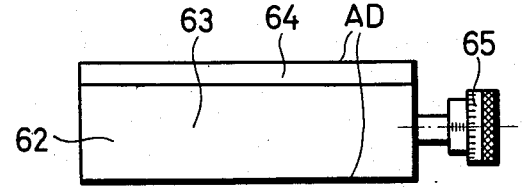

In FIG. 28 the outline of the frontal view of the interferometrical linear moving element 62 is shown. The technical characteristics are as follows:

| | |
|---|---|
| range of displacement | 2.5 mm |
| resolution of the scale | 0.1 μm and 0.2 μm, respectively |
| accuracy of reproduction | 0.1 μm. |

In FIG. 29 the side view of the outline of the interferometrical device 66 serving for the adjustment of the angular position may be seen, having a base plate 67, a circular table 68 and a setting member 69. The base plate 67 and the circular table 68 of said device are provided with the bore groups D enabling the assembly with other moving elements by means of the distance pieces. The inner structure is described in Hungarian Patent Application MA-3031. The technical characteristics are as follows:

| | |
|---|---|
| range of the rotational displacement | 0° to 360° |
| range of fine-adjustment | 1° |
| resolution of the scale | 3" |
| accuracy of reproduction | 1" |

Similarly, in FIG. 30 the front view of the interferometrical device 66 for the adjustment of the angular position may be seen.

Positioning of optical elements with less requirements, e.g. requiring a small range of displacement and in which the number of the required degrees of freedom does not exceed two, may be realized by means of tilting sockets to be tilted around two axes intersecting each other and being provided with a quick-centralizer insert.

Figure 31:
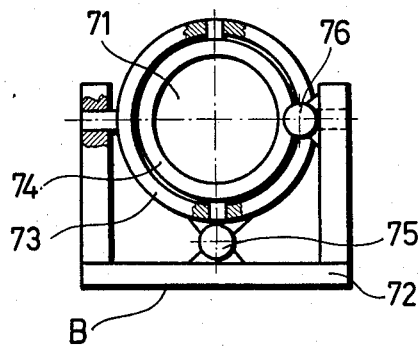

In FIG. 31 the outline of the normal tilting socket 71 is to be seen, which consists of the base plate 72, the first and second tilting plates 73 and 74, as well as of the first and second setting members 75, 76. On the base plate 72 of the tilting socket 71 the bore group B is arranged, enabling the assembly with the other basic moving elements by means of the distance pieces. The technical characteristics are as follows:

| | |
|---|---|
| range of rotational displacement | 6° |
| resolution of the scale | 30" |
| accuracy of reproduction | 3" |

Figure 32:
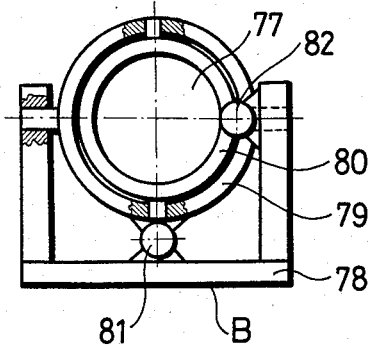

In FIG. 32 the interferometrical tilting socket 77 has been illustrated, consisting of the base plate 78, the first and second tilting plates 79, 80, furthermore of the first and second setting members 81, 82. It differs from the normal tilting socket 71 in that as a setting member a differential micrometer has been used. The base plate of the interferometrical tilting socket 77 is provided with the bore group B enabling the assembly with other basic moving elements by means of the distance pieces. The technical characteristics are as follows:

| | |
|---|---|
| range of the rotational displacement | 6° |
| range of fine-adjustment | 0.6° |
| resolution of the scale | 3" |
| accuracy of the reproduction | 1" |

The application of the optomechanical system to be assembled from the basic elements will be described in detail by means of FIGS. 33 and 34.

It derives from the given optical measurement, what kind of positioning, how many degrees of freedom, what ranges of displacement in the direction of the single degrees of freedom and what resolution of the scale are required by the optical elements included.

The number of the degrees of freedom needed determines the minimum number of the moving elements needed for the adjustment, whereas accuracy requirements are define the degree of accuracy of the elements. In case the desired range of adjustment exceeds the maximum range of displacement of the basic moving element with the required resolution of the scale, the desired range can be covered by assembling two or more element-rows, one on the top of the other, by means of suitable distance pieces. Let us assume that the required resolution amounts to 0.2 $\mu$m for a length of 4 mm. In this case two interferometrical linear moving elements should be used by using two base plates 40; after having assembled these in a position of identical direction, the required resolution within the desired range can be obtained.

Figure 33:
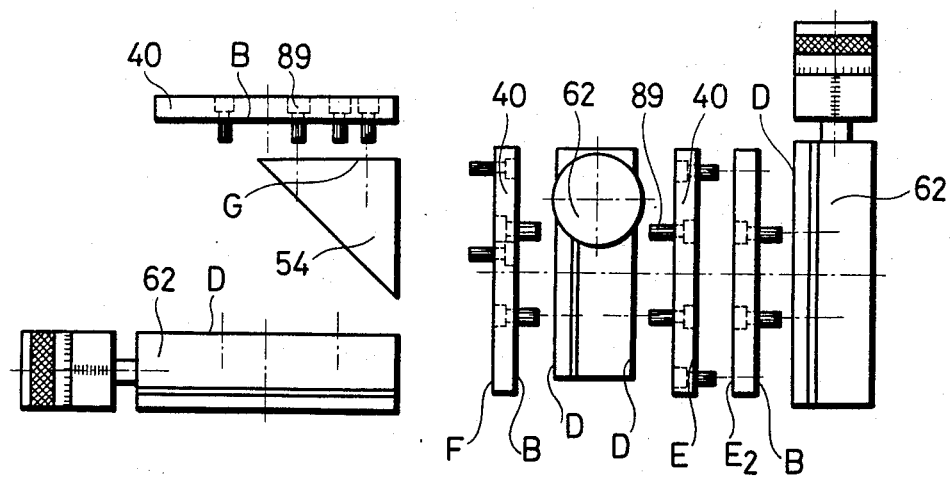

In FIG. 33 the arrangement of the assembly with three degrees of freedom has been illustrated. Taking into consideration that three degrees of freedom are desired, a minimum of three linear moving elements are required. Supposing, that the requirement of resolution amounts in all the three directions to 0.2 $\mu$m, and the range of displacement equals $\pm 1$ mm, one interferometrical linear element for all directions is sufficient. For the assembly of three interferometrical linear moving elements four base plates 40 and two right angles 54 are needed.

The order of sequence of assembling is as follows: the bore system D of the table 64 of the first interferometrical linear moving element 27 is connected to the bore system B of the base plate 40 by means of four fixing bolts 89, while the bore system D of the base plate 63 of the second interferometrical linear moving element is connected to the bore group B of the second base plate 40, whereby the bore group B is obtained by rotating by 90° the first plate 40. Fastening of the base plates 40 lying in—between the first and second interferometrical linear moving elements 27—takes place by the aid of the bore groups E-E$_2$. Fixation of the third linear moving elements 27 may be performed in a similar manner. Taking into consideration, that an assembly in a perpendicular position is wanted, connection of the third and fourth base plates 40 is to be performed by means of two right angles 54, by means of the bore group F arranged on the third base plate and the bore system G on the right angles 54. The table 64 of the second interferometrical moving element 27 is also connected by means of the bore system D to the bore system B of the third base plate 40. The third interferometrical linear moving element 27 is connected by means of the bore system D arranged on its base plate 63 to the bore system B of the fourth base plate 40.

The numerous possibilities of variables to be obtained by the system can be demonstrated by the fact that in relation to the second linear moving element the third one can be assembled in sixteen different vertical positions. The rigid connection between the individual basic elements is ensured by the fixing bolts 89.

Figure 34:
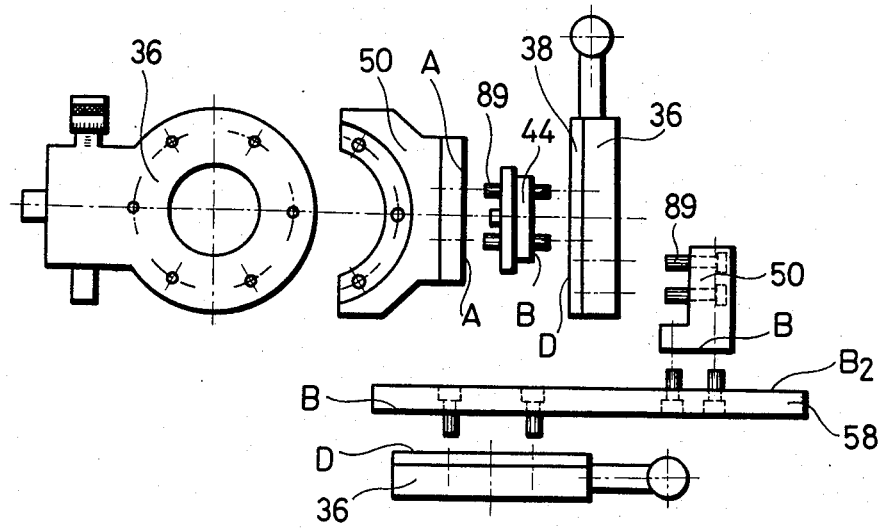

In FIG. 34 the arrangement of the device serving for the adjustment of the angular position, having three degrees of freedom, is to be seen. In order to simplify the example, let us suppose, that the desired range of adjustment can be obtained by one moving element in the individual directions. The bore system D being on the turning part of the normal device 36 for adjusting the angular position is connected by means of four fixing bolts 89 to the bore system B of the second through plate 58 of the length of two rasters, while the bore system B$_2$ on the other end of the through plate is fixed to the bore system B arranged on the support 50 of the device for adjusting the angular position. The second device 36 for the adjustment of the angular position is fixed by means of three fixing bolts 89 to the support 50. The bore system D on the circular table 38 of the second device 36 for adjusting the angular position is connected to the centering support 44 through the bore system B by means of the fixing bolts 89. Thereafter, the support 44 is fastened through the bore system A$_1$ to the bore system A of the second support 50 of the device for the adjustment of the angular position. Finally the third device 36 for the adjustment of the angular position is fastened to the support 50 by means of the three fixing bolts 89.

Figure 35:
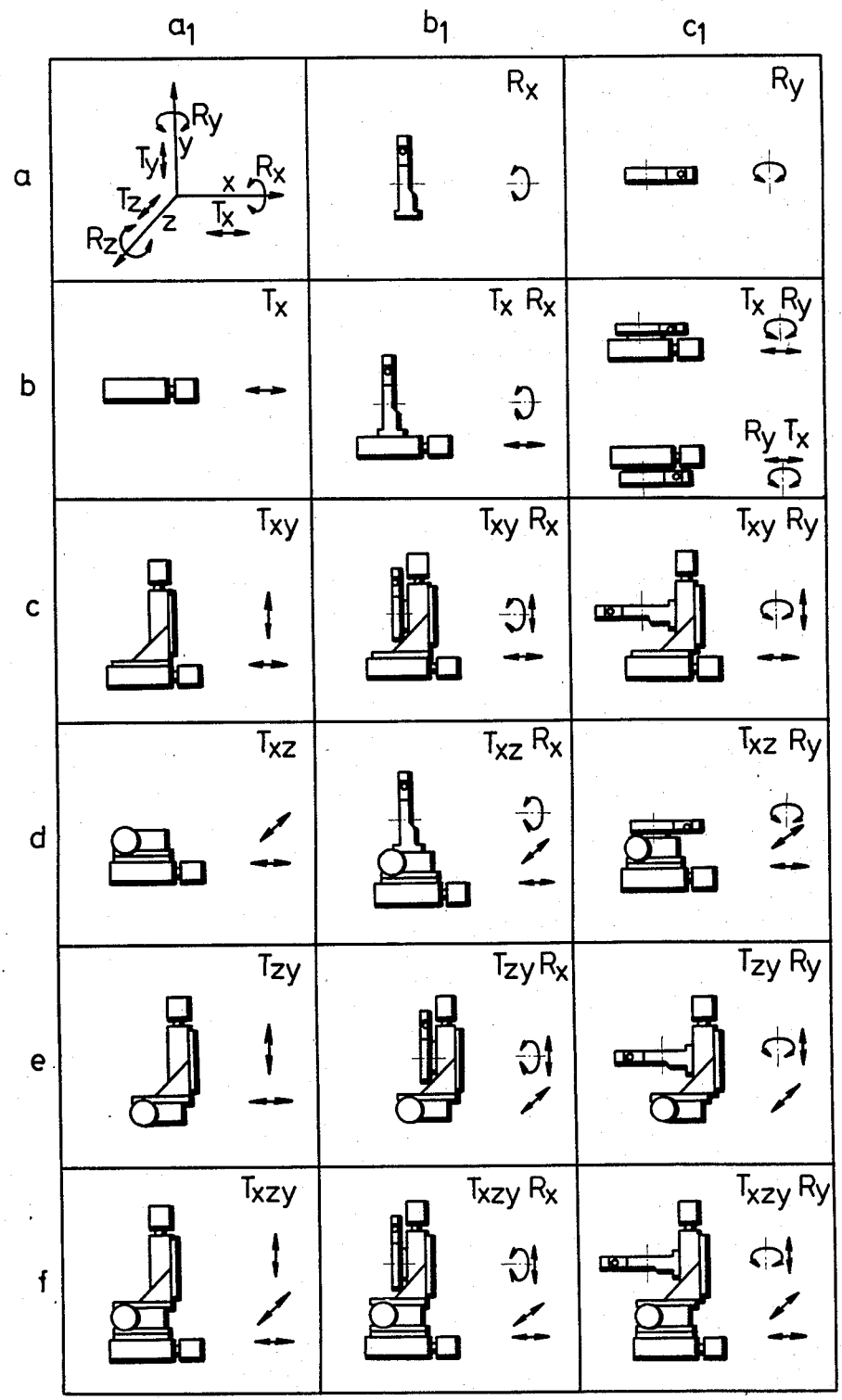
Figure 36:
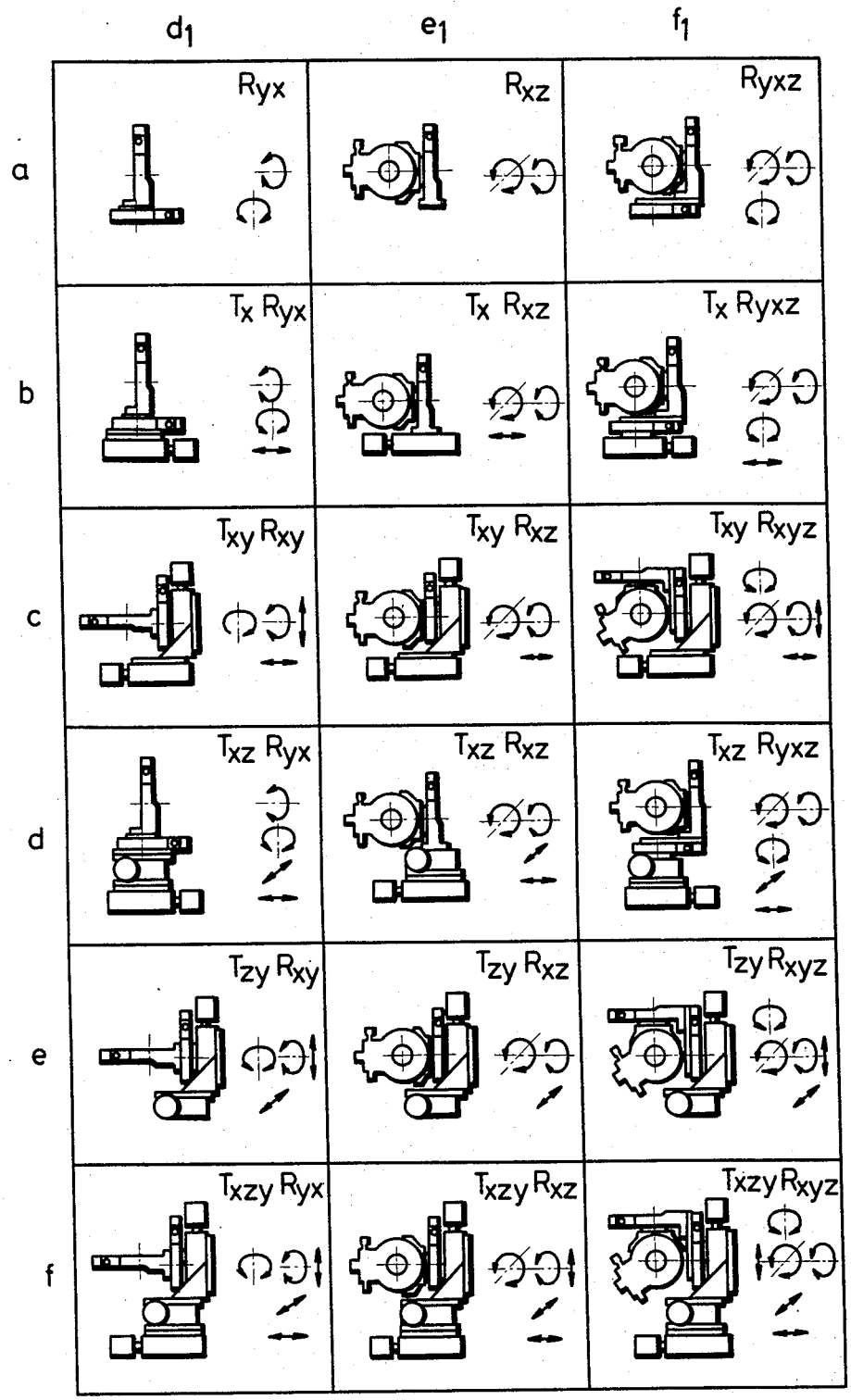

The different variables of assembly of the optomechanical system according to the invention will be detailed by means of the FIGS. 35, 36, illustrating only the most essential basic cases.

In FIG. 35 the different ways of assembly may be seen which are suitable for realizing the diverse variables of turning and displacement, by means of the normal linear moving elements 31, as well as by the normal devices 36 for the adjustment of the angular position, while in FIG. 36 the arrangements composed on the interferometrical linear moving elements 62, the interferometrical device 66 for adjusting the angular position, the base plate 40, the support 44, the support 50 for the device for adjusting the angular position, the rectangle 54, the through plates 57, 58, 59, the raising block 83 and the underlay plate 86 have been illustrated. The symbols used in the figures are illustrated in the coordinate system to be seen in the first column "a$_1$" of the first line of FIG. 35, where x, y and z indicate the directions of the axis rx, Ry and Rz the rotations around the axes Tx, Ty and Tz stand for the axial linear displacement. The first lines of FIGS. 35 and 36 show the moving elements with one or more degree of freedom built up only of devices for the adjustment of the angular position, in the first column "a$_1$" of FIG. 35 moving devices built up only of linear moving elements and having one or more degrees of freedom are to be seen. The further elements of FIGS. 35 and 36 show the combination of the moving structures obtained with the elements b$_1$, c$_1$, d$_1$, e$_1$, f$_1$ of the first line and the elements b, c, d, e, f of the first column.

The advantages of the optomechanical system according to the invention lie in that it is built up of basic elements of several types and by using two moving basic elements belonging to the normal class of accuracy, as well as by means of a set of distance pieces, 80% of the task solved by the systems ARDEL and PI representing the state of the art can be solved. After having completed the system with moving elements and tilting sockets belonging to the class of interferometrical accuracy, a system may be obtained, which—due to the numerous combinative possibilities—well enables the independence of the single degrees of freedom, even with different sizes and kinds of optical objectives. The moving elements of the system belonging to the class of interferometrical accuracy ensure the compliance with the requirements in respect to reproductional and absolute accuracy within a wider range, than at the known solutions.

Said possibilities yield significant perspectives from the point of view of the utilization of light sources of such characteristics, especially in view of the growth of use of lasers.

The optomechanical system built up of the basic elements can be advantageously used for positioning and displacing optical elements of different types and sizes used in the course of optical measurements and experiments.

What we claim is:

1. An optomechanical system consisting of basic elements for moving and adjusting optical elements with a number of degrees of freedom, wherein said system comprises linear moving elements (31), rotating elements (36) and a plurality of different distance pieces having a uniform bore system, the bore system containing a plurality of kinds of bore groups (A to G) and the single bore groups comprising through bores (O), threaded bores (M) and setting bores (H) in cooperation with set pins ($H_1$), the distance pieces comprising at least two base plates (40), three different through plates (57, 58, 59) a centralizing underlay (44), a rectangular piece (54), a raising block (83), an underlay plate (86) as well as at least an assembled support (50) consisting of a base plate (51) and a clevis (52) whereby at least one linear moving element (31) and rotating element (36) can be assembled by interposing said distance pieces to form a desired composition in such a way that upon the mounting of the components the corresponding bore pairs (A-$A_1$; B-$B_2$; C-$C_2$; D-$D_1$; E-$E_2$; F-G; D-$B_2$; G-$B_2$) are joined together.

2. An optomechanical system as claimed in claim 1, in which the base plate (40) comprises five kinds of bore groups (A, B, C, E, F), the first through plate (57) three kinds of bore groups (A, B, C), the second through plate (58) two times three kinds of bore groups (A, B, C and A, $B_2$, $C_2$), the third through plate (59) three kinds of bore groups (A, $B_2$, $C_2$; A, B, C; A, $B_2$, $C_2$), the centralizing underlay (44) comprises two kinds of bore groups ($A_1$, B), the rectangular piece (54) comprises on its two plates, at right angles to each other, only one kind of bore group (G), the raising block (83) comprises two kinds of bore groups (A, B), the underlay plate (86) comprises two kinds of bore groups ($A_1$, D) and the base plate (51) of the assembled support (50) comprises two kinds of bore groups (A, B).

3. An optomechanical system according to claim 1, comprising also at least one low-friction interferometrical linear moving element (62).

4. An optomechanical system according to claim 1, comprising also at least one friction-proof rotating element (66).

5. An optomechanical system according to claim 1, comprising at least one moving elements with a normal tilting socket (71).

6. An optomechanical system according to claim 1, comprising at least one moving element with an interferometrical tilting socket (77).

7. An optomechanical system as claimed in claim 1, in which the base plate (32, 63) and the table (33, 64) of the friction-free normal and interferometrical moving element (31, 62) contains two bore groups of two kinds (A-D), and the base plate (37, 67) and the table (38, 65) of the normal and interferometrical moving element (36, 66) comprise one bore group of one kind (D) and the base plate (72, 78) of the normal and interferometrical tilting socket (71, 77) each comprise one bore group of one other kind (B).

* * * * *